US009946801B2

(12) United States Patent
Raghunathan

(10) Patent No.: US 9,946,801 B2
(45) Date of Patent: *Apr. 17, 2018

(54) REAL-TIME SEARCH TERM POPULARITY DETERMINATION, BY SEARCH ORIGIN GEOGRAPHIC LOCATION

(75) Inventor: Vijay Raghunathan, San Francisco, CA (US)

(73) Assignee: Excalibur IP, LLC, New York, NY (US)

( * ) Notice: Subject to any disclaimer, the term of this patent is extended or adjusted under 35 U.S.C. 154(b) by 1392 days.

This patent is subject to a terminal disclaimer.

(21) Appl. No.: 12/189,723

(22) Filed: Aug. 11, 2008

(65) Prior Publication Data

US 2009/0089280 A1 Apr. 2, 2009

Related U.S. Application Data

(63) Continuation of application No. 11/862,967, filed on Sep. 27, 2007, now Pat. No. 7,428,522.

(51) Int. Cl.
*G06F 17/30* (2006.01)
*G06F 7/00* (2006.01)

(52) U.S. Cl.
CPC ............... *G06F 17/3087* (2013.01)

(58) Field of Classification Search
CPC ........... G06F 17/30864; G06F 17/3087; G06F 17/30867
USPC ........................................................ 707/758
See application file for complete search history.

(56) References Cited

U.S. PATENT DOCUMENTS

| 6,202,023 B1 | 3/2001 | Hancock et al. |
| 6,757,740 B1 | 6/2004 | Parekh et al. |
| 7,051,023 B2 | 5/2006 | Kapur et al. |
| 7,146,416 B1 | 12/2006 | Yoo et al. |
| 7,428,522 B1 * | 9/2008 | Raghunathan ......... 707/999.001 |
| 7,565,425 B2 * | 7/2009 | Van Vleet et al. ........... 709/224 |
| 7,672,937 B2 * | 3/2010 | Madhavan et al. .......... 707/752 |
| 7,680,775 B2 * | 3/2010 | Levin et al. ........... 707/999.003 |
| 7,685,099 B2 * | 3/2010 | Liu et al. .......................... 706/8 |
| 7,685,100 B2 * | 3/2010 | Liu et al. .......................... 706/8 |

(Continued)

OTHER PUBLICATIONS

Lamm, S.E. and D.A. Reed "Real-Time Geographic Visualization of World Wide Web Traffic", Computer Networks and ISDN Systems, vol. 28, No. 7, May 1996, pp. 1457-1468.*

(Continued)

*Primary Examiner* — Kimberly Wilson
(74) *Attorney, Agent, or Firm* — Weaver Austin Villeneuve & Sampson LLP

(57) ABSTRACT

Information is generated indicative of frequency of search terms presented to at least one online search service. As event indications, indicative of user interaction generally with front end servers, are being provided for persistent storage, ones of the event indications that are indicative of search events are detected. The detected ones of the search event indications are processed and it is determined, based at least in part thereon, by location, frequency data indicative of a frequency of each of a plurality of search terms presented to the at least one online search service. An indication of at least some of the frequency data is caused to be associated with indications of locations to which the frequency data corresponds. For example, the frequency data may be displayed superimposed on a map.

29 Claims, 6 Drawing Sheets

(56) References Cited

U.S. PATENT DOCUMENTS

| | | | |
|---|---|---|---|
| 7,689,622 B2* | 3/2010 | Liu et al. | 707/751 |
| 7,693,823 B2* | 4/2010 | Liu et al. | 706/8 |
| 7,693,908 B2* | 4/2010 | Liu et al. | 707/751 |
| 7,698,479 B2* | 4/2010 | Georgalas et al. | 710/36 |
| 7,895,325 B2* | 2/2011 | Van Vleet et al. | 709/224 |
| 2003/0004781 A1 | 1/2003 | Mallon et al. | |
| 2003/0014399 A1* | 1/2003 | Hansen et al. | 707/3 |
| 2004/0199498 A1 | 10/2004 | Kapur et al. | |
| 2004/0225647 A1 | 11/2004 | Connelly et al. | |
| 2004/0249700 A1 | 12/2004 | Gross | |
| 2004/0249713 A1 | 12/2004 | Gross | |
| 2004/0260600 A1 | 12/2004 | Gross | |
| 2004/0260688 A1 | 12/2004 | Gross | |
| 2004/0267604 A1 | 12/2004 | Gross | |
| 2005/0004903 A1 | 1/2005 | Tsuda | |
| 2005/0033803 A1 | 2/2005 | Vleet et al. | |
| 2005/0050215 A1 | 3/2005 | Lin et al. | |
| 2005/0102259 A1 | 5/2005 | Kapur | |
| 2005/0216498 A1* | 9/2005 | Georgalas et al. | 707/102 |
| 2005/0246358 A1 | 11/2005 | Gross | |
| 2005/0246391 A1 | 11/2005 | Gross | |
| 2006/0004704 A1 | 1/2006 | Gross | |
| 2006/0010029 A1 | 1/2006 | Gross | |
| 2006/0059133 A1* | 3/2006 | Moritani | G06F 17/30887 |
| 2006/0074870 A1 | 4/2006 | Brill et al. | |
| 2006/0112178 A1* | 5/2006 | Van Vleet et al. | 709/224 |
| 2006/0122994 A1 | 6/2006 | Kapur et al. | |
| 2006/0123014 A1 | 6/2006 | Ng | |
| 2006/0167896 A1 | 7/2006 | Kapur et al. | |
| 2007/0050353 A1* | 3/2007 | Ekberg et al. | 707/5 |
| 2007/0162379 A1 | 7/2007 | Skinner | |
| 2008/0028010 A1* | 1/2008 | Ramsey | 707/205 |
| 2008/0243632 A1* | 10/2008 | Kane et al. | 705/26 |
| 2008/0256444 A1* | 10/2008 | Wang et al. | 715/700 |
| 2009/0276407 A1* | 11/2009 | Van Vleet et al. | 707/3 |
| 2009/0292677 A1* | 11/2009 | Kim | 707/3 |

OTHER PUBLICATIONS

Boulton, C. "Google Indexes Hot Trends in Search Results", downloaded from googlewatch.eweek.com, Sep. 28, 2009.*

Carneiro, H.A. and E. Mylonakis "Google Trends: A Web-Based Tool for Real-Time Surveillance of Disease Outbreaks", Clinical Infectious Diseases, vol. 49, No. 10, Nov. 15, 2009, pp. 1557-1564.*

Watters and Amoudi, "GeoSearcher: Geospatial ranking of search engine results," Proceedings of the American Society for Information Science and Technology, vol. 39, Issue 1 , pp. 409-416, Published Online: Jan. 31, 2005, http://www3.interscience.wiley.com/cgi-bin/abstract/109882614/.

Gish et al., "Geographical Statistics and Characteristics of P2P Query Strings, " School of Electrical Engineering, Tel-Aviv University, Israel, http://research.microsoft.com/workshops/IPTPS2007/papers/ShakedGishTankelShav itt.pdf.

Lamma et al., "Real-time geographic visualization of World Wide Web traffic," Source: Computer Networks and ISDN Systems, vol. 28, No. 7, May 1996 , pp. 1457-1468(12), Department of Computer Science, University of Illinois, Urbana, IL, Netscape Communications Corporation, Mountain View, CA, http://www.sciencedirect.com/science?_ob=ArticleURL&_udi=B6TYT-3XY8PKJ-1R&_user=10&_coverDate=05%2F31%2F1996&_rdoc=1&_fmt=&_orig=search&_sort=d&view=c&_acct=C000050221&_version=1&_urlVersion=0&_userid=10&md5=5a5ef16949133245d92edbbb5a49ab41.

Myllymaki and Kaufman, "High-Performance Spatial Indexing for Location-Based Services," International World Wide Web Conference archive, Proceedings of the 12th international conference on World Wide Web table of contents, Budapest, Hungary, SESSION: Information retrieval 2 table of contents, pp. 112-117, Year of Publication: 2003, ISBN:1-58113-680-3.

Yahoo! "Yahoo! Launches Yahoo! Buzz Index for Brand Marketers", press release, Oct. 30, 2000.

Chaney, D. "Private Metrics: An Eye to the Keyhole", MediaPost Publications, downloaded from publications.mediapost.corn, Jan. 2001.

Pramudiono, I., T. Shintani, K. Takahashi and M. Kitsuregawa "User Behavior Analysis of Location Aware Search Engine", Proceedings of the 3rd International Conference on Mobile Data Management (MDM902), Jan. 8-11, 2002.

Yahoo! "Yahoo! Buzz Index—World Weekly", downloaded from buzz.yahoo.com1world, Aug. 9, 2002.

Spink, A., S. Ozmutla, H.C. Ozmutla and B.J. Jansen "U.S. Versus European Web Searching Trends", S1G1R Forum, vol. 36, No. 2, Fall 2002, pp. 32-38.

Google "Google Press Center: 2002 Year-End Zeitgeist", downloaded from www.google.com/press/zeitgeist.html, Feb. 7, 2003.

Beitzel, S.M., E.C. Jensen, A. Chowdhury, D. Grossman and O. Frieder "Hourly Analysis of a Very Large Topically Categorized Web Query Log", Proceedings of the 27th Annual International ACM S1G1R Conference on Research and Development in Information Retrieval, Jul. 25-29, 2004, pp. 321-328.

Klemm, A., C. Lindemann, M.K. Vernon and O.P. Waldhorst "Characterizing the Query Behavior in Peer-to-Peer File Sharing Systems", Proceedings of the 4th ACM SIGCOMM Conference on Internet Measurement (IMC'04), Oct. 25-27, 2004, pp. 55-67.

Otsuka, S., M. Toyoda, J. Hira and M. Kitsuregawa "Extracting User Behavior by Web Communities Technology on Global Web Logs", in Database and Expert Systems Applications, vol. 3180/2004, 2004, pp. 957-968.

Google "Google Press Center: Zeitgeist", downloaded from www.google.com/press/intl-zeitgeist.html, Feb. 8, 2006.

Yahoo! "Yahoo! Buzz Index Frequently Asked Questions", downloaded from buzz.yahoo.com/faq, Mar. 31, 2006.

Yahoo! "The Most Searched Term on Yahoo! Canada—Yahoo! Canada", downloaded from ca.buu.yahoo.com, Apr. 6, 2006.

Saleh, O. and M. Hefeeda "Modeling and Caching of Peer-to-Peer Traffic", Simon Fraser University, School of Computing Science, Technical Report TR-2006-11, May 2006.

Google "Google Trends: About Google Trends", downloaded from www.google.comlintl/enltrends/about.html, Aug. 10, 2006.

Chellapilla, K. and D.M. Chickering "Improving Cloaking Detection Using Search Query Popularity and Monetizability", Proceedings of the 2nd International Workshop on Adversarial Information Retrieval on the Web, Aug. 10, 2006.

Spink, A., H. Partridge and B.J. Jansen "Sexual and Pornographic Web Searching: Trends Analysis", First Monday, vol. 11, No. 9, Sep. 2006.

Stanger, N. The View from the Chathams: Geovisualization of Web Site Hits using Google Earthmn, Proceedings of the 18th Annual Colloquium of the Spatial Information Research Centre, University of Otago, Dunedin, New Zealand, Nov. 6-7, 2006.

Beitzel, S.M., E.C. Jensen, A. Chowdhury, O. Frieder and D. Grossman "Temporal Analysis of a Very Large Topically, Categorized Web Query Log", Journal of the American Society for Information Science and Technology, vol. 58, No. 2, Nov. 22, 2006, pp. 166-178.

Pipes, A. "Yahoo! Buulist versus Google Trends", Readwriteweb, downloaded from www.readwriteweb.com, Aug. 2, 2007.

Google "Google Trends: cathartic", downloaded from www.google.com/trends, Nov. 8, 2007.

Accelerated Exam Support Document filed in U.S. Appl. No. 11/862,967.

Pre-Examination Search Document filed in U.S. Appl. No. 11/862,967.

U.S. Notice of Allowance dated Jul. 3, 2008, U.S. Appl. No. 11/862,967.

U.S. Final Office Action dated Jan. 15, 2008, U.S. Appl. No. 11/862,967.

U.S. Non-final Office Action dated Nov. 21, 2007, U.S. Appl. No. 11/862,967.

* cited by examiner

*(not present invention)*

REAL-TIME SEARCH TERM POPULARITY DETERMINATION, BY SEARCH ORIGIN GEOGRAPHIC LOCATION

CROSS REFERENCE TO RELATED APPLICATIONS

This application is a continuation of issued U.S. Pat. No. 7,428,522, filed on Sep. 27, 2007 as U.S. application Ser. No. 11/862,967, and entitled "REAL-TIME SEARCH TERM POPULARITY DETERMINATION, BY SEARCH ORIGIN GEOGRAPHIC LOCATION," which is incorporated by reference herein in its entirety.

BACKGROUND

It is known to process a search index, of an online search service, to determine a level of popularity of query terms made in a given time period, such as during a given day. Conventionally, such popularity determinations are made based on transaction data in a data warehouse, and it can take up to two to three days for the search query data in the data warehouse to be processed and the search index (with information about the popularity level of query terms) to be built and cleansed. Furthermore, the resolution of the popularity determinations (for example, temporally and geographically) may be limited.

SUMMARY

In accordance with an aspect of the invention, information is generated indicative of frequency of search terms presented to at least one online search service. As event indications, indicative of user interaction generally with front end servers, are being provided for persistent storage, event indications that are indicative of search events are detected. The detected search event indications are processed and it is determined, based at least in part thereon, by event origin location, frequency data indicative of a frequency of each of a plurality of search terms presented to at least one online search service. An indication of at least some of the frequency data is caused to be associated with indications of event origin locations to which the frequency data corresponds. For example, the frequency data may be displayed superimposed on a map including event origin locations.

Processing the detected ones of the search event indications and determining based at least in part thereon, by event origin location, frequency data indicative of a frequency of each of a plurality of search terms presented to the at least one online search service may include updating the determination of frequency data based on newly processed detected search event indications. Updating the determinations of frequency data based on newly processed detected search event indications may, for example, include applying an algorithm that automatically decays frequency values over time.

DETAILED DESCRIPTION

The inventors have realized that it can be useful for the level of popularity of query terms to be determined relatively quickly. For example, the determination may be useful in the process of marketing the keywords for advertisement targeting and/or other monetization. For example, it may be possible to target a "fresh" keyword or keywords before the market for that keyword is saturated. The inventors have additionally realized that, if the popularity determination can be resolved geographically and/or temporally, this may also provide advantages in marketing a keyword or keywords.

In accordance with an aspect, a method/system is described to determine high-frequency keywords in a search-stream, with a low latency. Additionally, the stream may be partitioned geographically (e.g., by city or other event origin location) and/or temporally (e.g., by hour or by time of day such as morning, afternoon, evening, etc.), allowing a user of the determinations to discern geographic and temporal differences in monetizing specific keywords. Search-events from front-end web-servers handling the search queries are processed in real-time. The latency of the frequency determinations may be less than one hour, or even under five minutes. Indications of the high-frequency keywords may be displayed, for example, relative to a map to allow for easy navigation.

Figure 1:
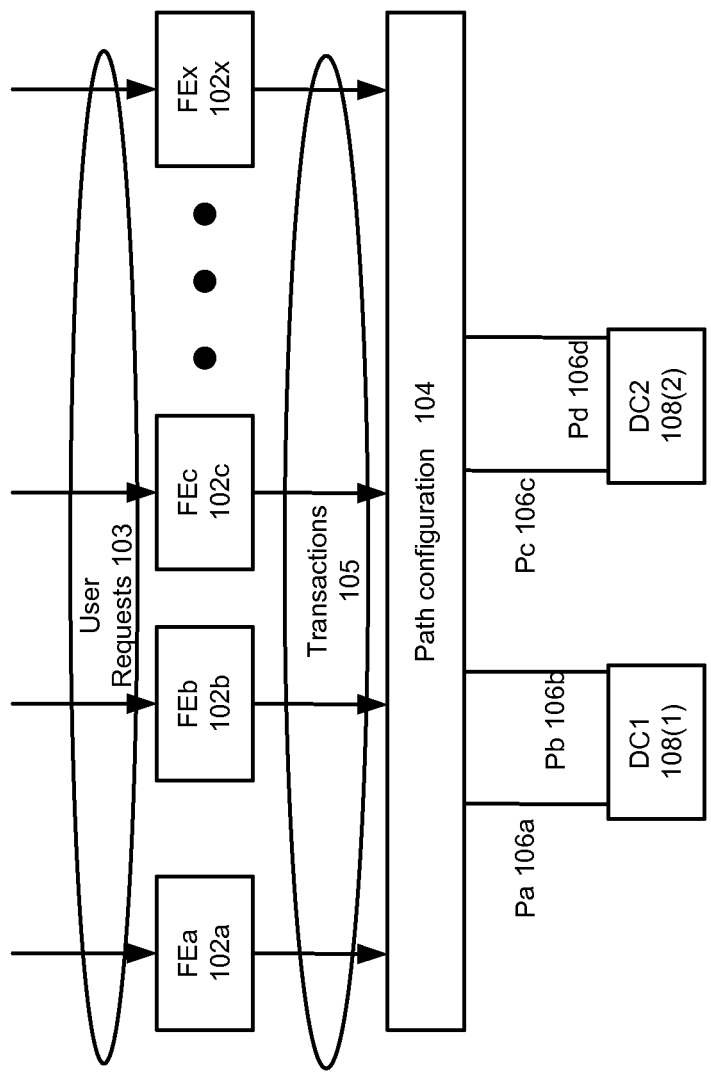
FIG. 1, which does not illustrate the present invention, illustrates an architecture of a system in which front end web servers, including front end web servers handling search events, are producing event data based on incoming user requests, including search queries each comprising at least one search term.

FIG. 1, which does not illustrate the present invention, illustrates an architecture of a system in which front end web servers FEa 102a, FEb 102b, FEc 102c, . . . , FEx 102x, including front end web servers handling search events, are producing event data 105 based on incoming user requests 103, including search queries each comprising at least one search term. The event data 105 is provided to data collectors DC1 108(1) and DC2 108(2) via paths Pa 106a, Pb 106b, Pc 106c and Pd 106d. In general, there may be numerous front end web servers, data collectors and paths; a small number are shown in FIG. 1 and throughout this patent description for simplicity of illustration. The particular paths may be determined according to a path configuration 104, for example, as described in U.S. patent application Ser. No. 11/734,067, filed on Apr. 11, 2007. U.S. patent application Ser. No. 11/734,067 is incorporated by reference at least for its disclosure of methods to determine path configurations.

The data collectors may be, for example, computers or computer systems in one or more data centers. A data center is a collection of machines (data collector machines) that are co-located (i.e., physically proximally-located). The data centers may be geographically dispersed to, for example, minimize latency of data communication between front end web servers and the data collectors. Within a data center, the network connection between machines is typically fast and reliable, as these connections are maintained within the facility itself. Communication between front end web servers and data centers, and among data centers, is typically over public or quasi-public networks (i.e., the internet).

Figure 2:
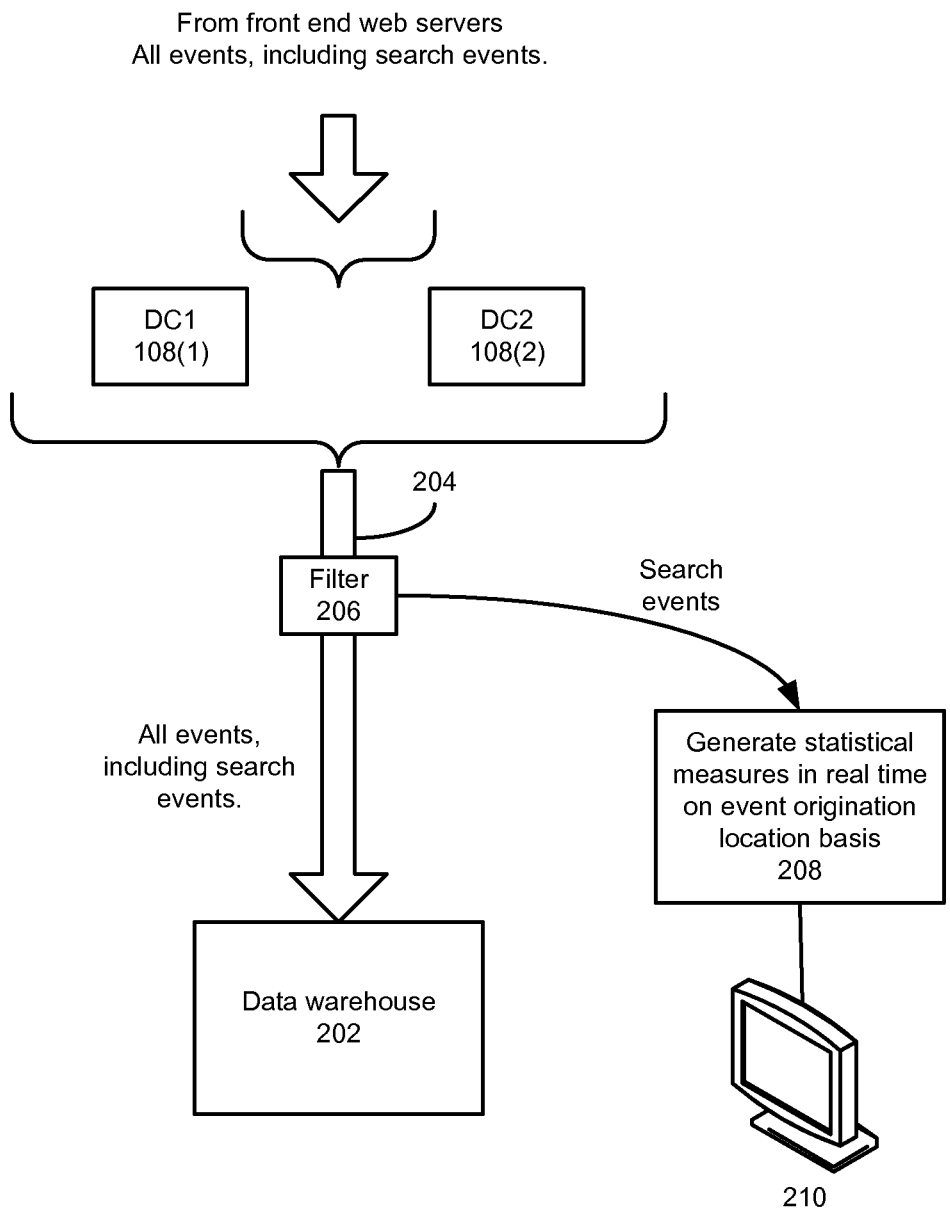
FIG. 2 schematically illustrates event data provided to the data collectors is further provided to a data warehouse via a "data highway," and a filter selects search event data.

Referring now to FIG. 2, the event data provided to the data collectors DC1 108(1) and DC2 108(2) via paths Pa 106a, Pb 106b, Pc 106c and Pd 106d are further provided to a data warehouse 202 via what may be thought of as a "data highway" 204. A filter 206 selects events that are from front end web servers that are search web servers.

For example, every event may be indicated by an event record that includes fields whose contents characterize the event. For example, an event record may include a field whose contents identify a "host name" or "space id" corresponding to a front end server that generated the event. A "space id" is a unique key that identifies the page contents and category. The contents of these event record fields may thus be highly indicative of whether the event is a search event. Other fields in an event record may include a time stamp, the URL accessed by a user, and an IP address via which a computing device accesses a search service (e.g., a computing device that executes a browser to access the search service). Other fields may be dependent on the type of event such as, for example, a field for a query term if the event is a search event.

We now discuss the data highway 204 in greater detail. The data highway 204 is a data pipeline via which a stream of events generated by data producers are provided to data consumers. The pipeline has been denoted as a "highway," because there are multiple offramps but, in one example, the pipeline is unidirectional. The highway may comprise multiple stages. Each stage forwards the events toward the data consumers, which in turn can be another stage, so the stages may be chained together. Additionally, each stage may include at least one filter to filter an event based on characteristics of the event. For instance, an event filter may be configured to "only give events that have been generated by data producer Y" or "only give events that occurred between 12:30 and 1:00 PM." Event filters may be combined together using Boolean logic (e.g., give events that come from data producer Y that occurred between 12:30 and 1:00 PM). In general, events that are filtered may also continue along their original path to the data warehouse 202.

For events determined by the filter 206 (e.g., from the host name or via some other means) to be a search event or highly likely to be a search event, statistics are generated (208) in real time on the basis of some characteristic evidenced by the events. More particularly, statistics are generated to correlate events having particular characteristics with the search query terms presented to the search service. An indication of the generated statistics is caused to be displayed 210.

In the FIG. 2 example, the statistics are generated based on geographic locations associated with the origins of the events. That is, statistics are generated to correlate events originating from particular geographic locations or regions with the search query terms of those events. The geographic locations may be determined, for example, by correlating the IP address via which a computing device accesses the search service, as indicated in an event record, to a known or discerned location associated with that IP address. As another example, a geographic location associated with an event origination may be determined based on one or more cookies in the event record for that event. For example, for an event corresponding to a logged-in Yahoo! user, the geographic location for that event may be determined based on known demographic information maintained by Yahoo! and corresponding to that logged-in Yahoo! user.

Figure 3:
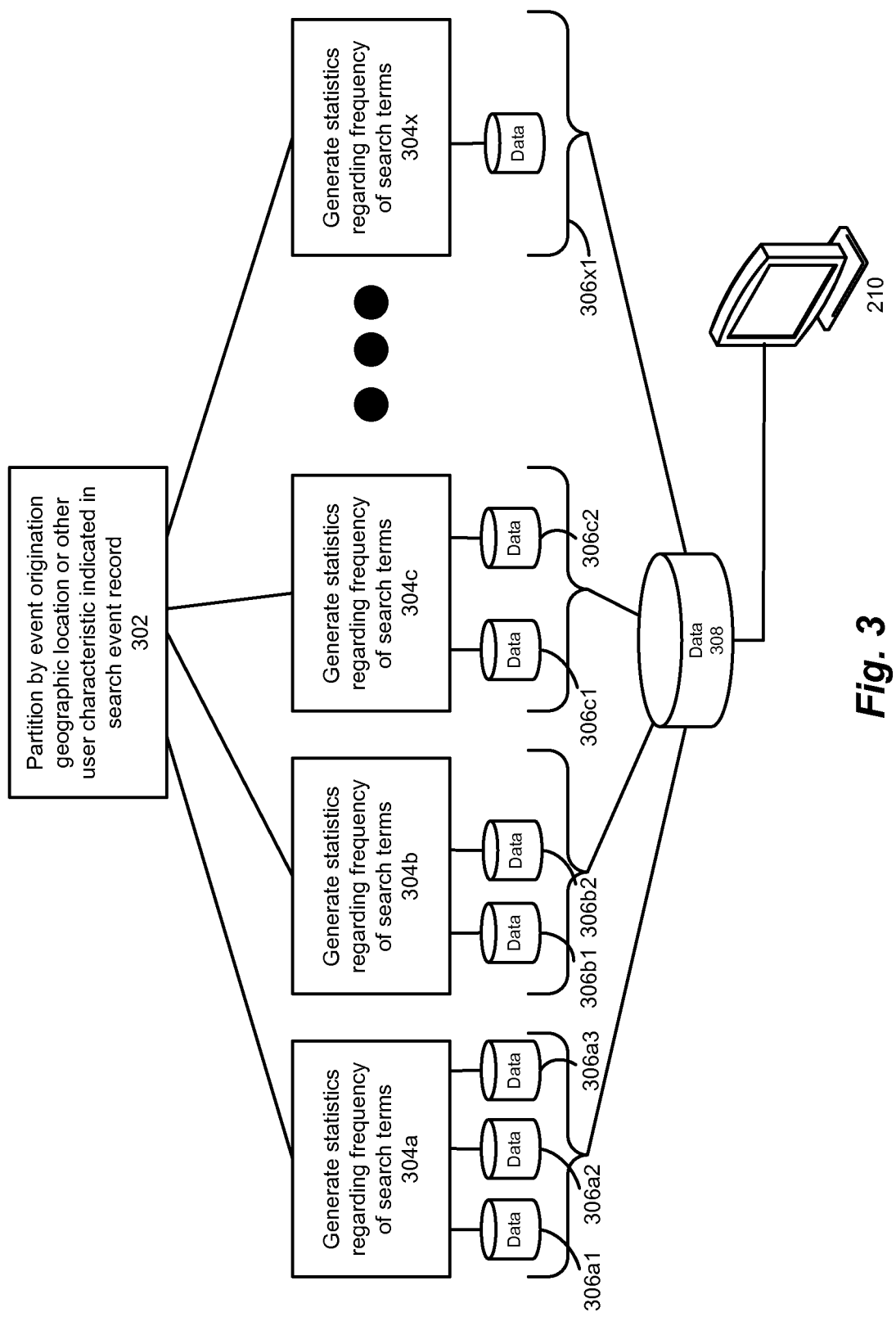
FIG. 3 illustrates an example architecture of the statistics generation block of FIG. 2.

FIG. 3 illustrates an example architecture of the statistics generation block 208 of FIG. 2. In block 302, the search events are partitioned by geographic location or other characteristic indicated in the search event and which is to be correlated to the search query terms to generate the statistics. Thus, for example, if the statistics are to be generated to correlate particular geographic locations to the search query terms presented to the search service from those geographic locations, then the events are partitioned by geographic location. (For example, a geolocation targeting call, to a specialized geolocation program, may be employed to determine the latitude & longitude associated with the search event based on the IP address associated with the search event.) Thus, for example, the processing of events may be partitioned into distinct disjoint sets to distribute the statistics generation processing. Partitioning based on geography can be useful given that, in general, events from multiple geographic locations are not processed to determine the most popular search terms in any one particular geographic location. The partitioning facilitates scaling of the statistic generation processing for greater numbers of events and/or for additional geographic locations or other event characteristics.

Partitions 304a, 304b, 304c, . . . , 304x generate statistics regarding frequency of search terms correlated to search event characteristics such as geographic location. It is noted that while, in some examples, each partition may handle statistics generation for one or more search event characteristic values (and/or aggregation of search event characteristic values), in general, statistics generation for a particular one or more search event characteristics values (or aggregation of search event characteristic values) is not distributed across multiple partitions. Thus, for example, partition 304a may generate statistics 306a1, 306a2 and 306a3 for three respective search event characteristic values (and/or aggregation of search event characteristic values). Similarly, partition 304b may generate statistics 306b1 and 306b2 for two respective search event characteristic values (and/or aggregation of search event characteristic values); partition 304c may generate statistics 306c1 and 306c2 for two respective search event characteristic values (and/or aggregation of search event characteristic values); and partition 304x may generate statistics 306x for one search event characteristic value (and/or aggregation of search event characteristic values).

The statistics 306a1, 306a2 and 306a3 (generated by partition 304a); 306b1 and 306b2 (generated by partition 304b); 306c1 and 306c2 (generated by partition 304c) and 306x1 (generated by partition 304x) are generated and maintained locally by each respective partition 304a, 304b, 304c, . . . , 304x. The generated statistics are occasionally (e.g., periodically) "dumped" to a location 308 accessible for display 210.

In accordance with one example, the statistics generation employs a traffic analysis algorithm that generates, on a rolling basis, an indication of the most popular search query terms based on the events presented to it. The traffic analysis algorithm may be configured to account not only for frequency, but also for temporality, in the statistics generation.

As a specific example, the algorithm may be such that frequency values for search query terms automatically decay over time based. A simplistic example of one particular implementation is now described. In the example, an array is used by each partition 304 to accumulate statistics regarding frequency of search terms represented by events presented to that partition. In particular, each item of the array indicates one search query term and a frequency associated with that search term. In the example, it is assumed that the array is of size three and, initially, the items of the array are empty. If the following search term data is sent into the partition:

{"a", "b", "c", "a", "d", "d", "b"} the first three letters will be added (step 1) since, as each of the first three letters is processed, the array is not full yet. The column "current state of array" includes each keyword and the current calculated frequency for that keyword. The star is the moving pointer to a 'current' index in the array). After step 1, the "current" index is to the first item in the array, containing "a."

| Step | Data already processed | current state of array | data to be processed |
|---|---|---|---|
| 1 | {'a', 'b', 'c'} | {*'a'->1, 'b'->1, 'c'->1} | {'a', 'a', 'd', 'd', 'b'} |
| 2 | {'a', 'b', 'c', 'a'} | {*'a'->2, 'b'->1, 'c'->1} | {'a', 'd', 'd', 'b'} |
| 3 | {'a', 'b', 'c', 'a', 'a'} | {*'a'->3, 'b'->1, 'c'->1} | {'d', 'd', 'b'} |
| 4 | {'a', 'b', 'c', 'a', 'a', 'd'} | {'a'->2, *'b'->1, 'c'->1} | {'d', 'b'} |
| 5 | {'a', 'b', 'c', 'a', 'a', 'd', 'd'} | {'a'->2, 'd'->1, *'c'->1} | {'b'} |
| 6 | {'a', 'b', 'c', 'a', 'a', 'd', 'd', 'b'} | {*'a'->2, 'd'->1, 'b'->1} | { } |

At step 2, the second "a" has been processed. Since the "current" index is already pointing to an item in the array that contains "a," the frequency for "a" is incremented to two at step 2. At step 3, the third "a" has been processed. Like at step 2, since the "current" index is already pointing to an item in the array that contains "a," the frequency for "a" is incremented to three at step 3.

At step 4, a "d" has been processed. Since the "current" index points to an item in the array that contains "a" and does not contain "d," the frequency for "a" is decremented and the "current" index is moved to point to the next item in the array. At step 5, another "d" has been processed. Since decrementing the frequency for "b" (the item to which the "current" index points) results in a frequency of zero for "b," the "b" is replaced with the "d," and the "d" is indicated by a frequency of one. Furthermore, the "current" index is moved to point to the next item of the array, containing "c." At step 6, an additional "b" has been processed. Since the "current" index pointed to "c" with a frequency of one, the "c" is replaced with the "b" and the "b" is indicated by a frequency of one. Furthermore, the "current" index is moved to point to the "a."

Figure 4:
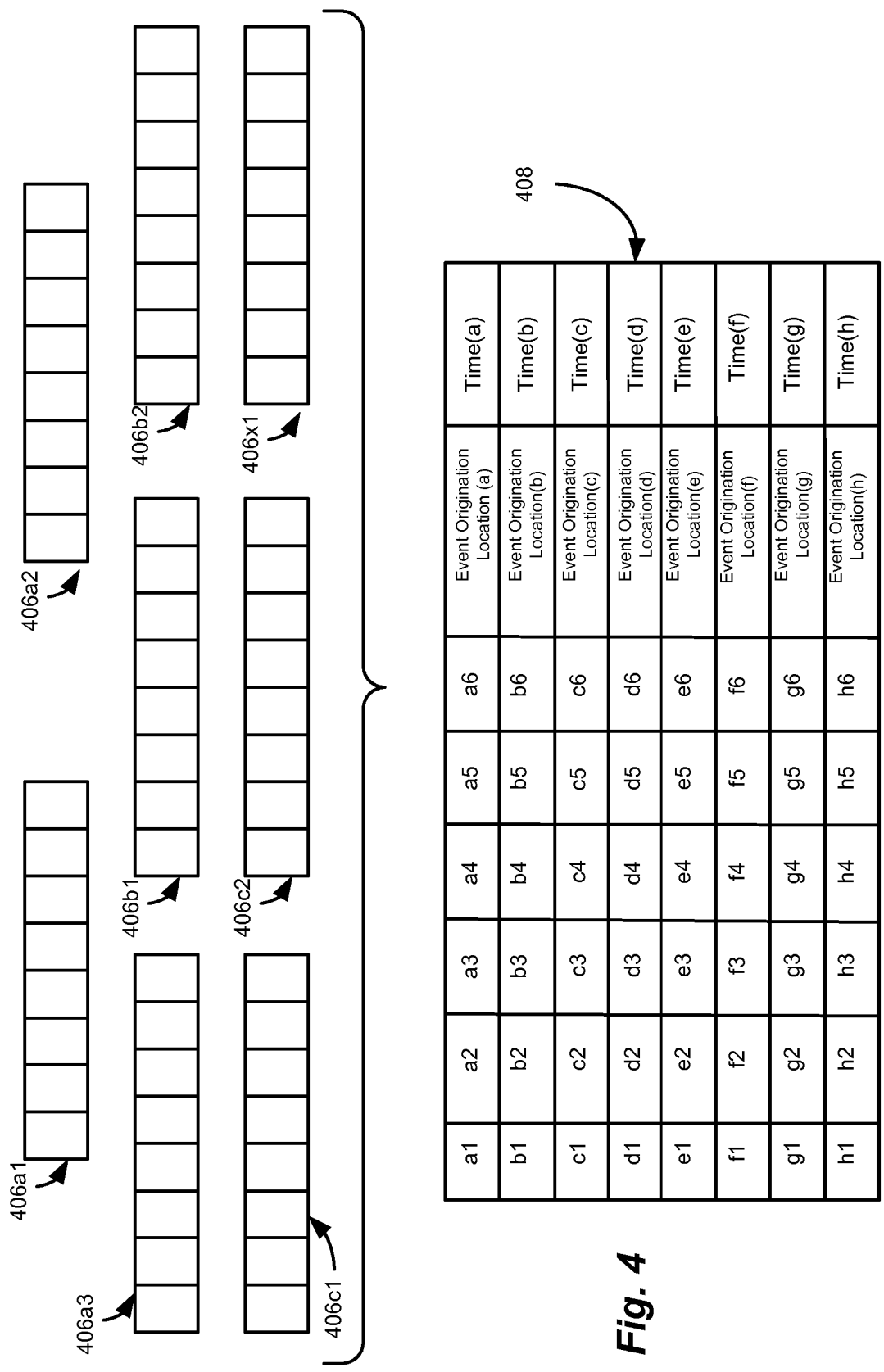
FIG. 4 illustrates schematically how various arrays are "dumped" to a data structure accessible for display.

Thus, at any time, the array includes indications of search term frequencies (perhaps weighted in view of the operation of the algorithm that maintains the indications) for a particular geographic location (or, more generally, for a particular characteristic value on which the events were categorized). FIG. 4 illustrates schematically how the various arrays (denoted by reference numerals 406a1, 406a2, and 406a3; 406b1 and 406b2; 406c1 and 406c2; and 406x1) are "dumped" to a data structure 408 (e.g., a shared memory hash table) accessible for display. In the FIG. 4 example, the data records in the structure 408 each include the query indications and frequency indications (e.g., "a1" may indicate a particular query term and its associated frequency), as well as including an indication of the geographic location the query indications are for and a time corresponding to the record (e.g., the last time a query indication was updated, or the time the data of the record was provided from a partition).

Figure 5:
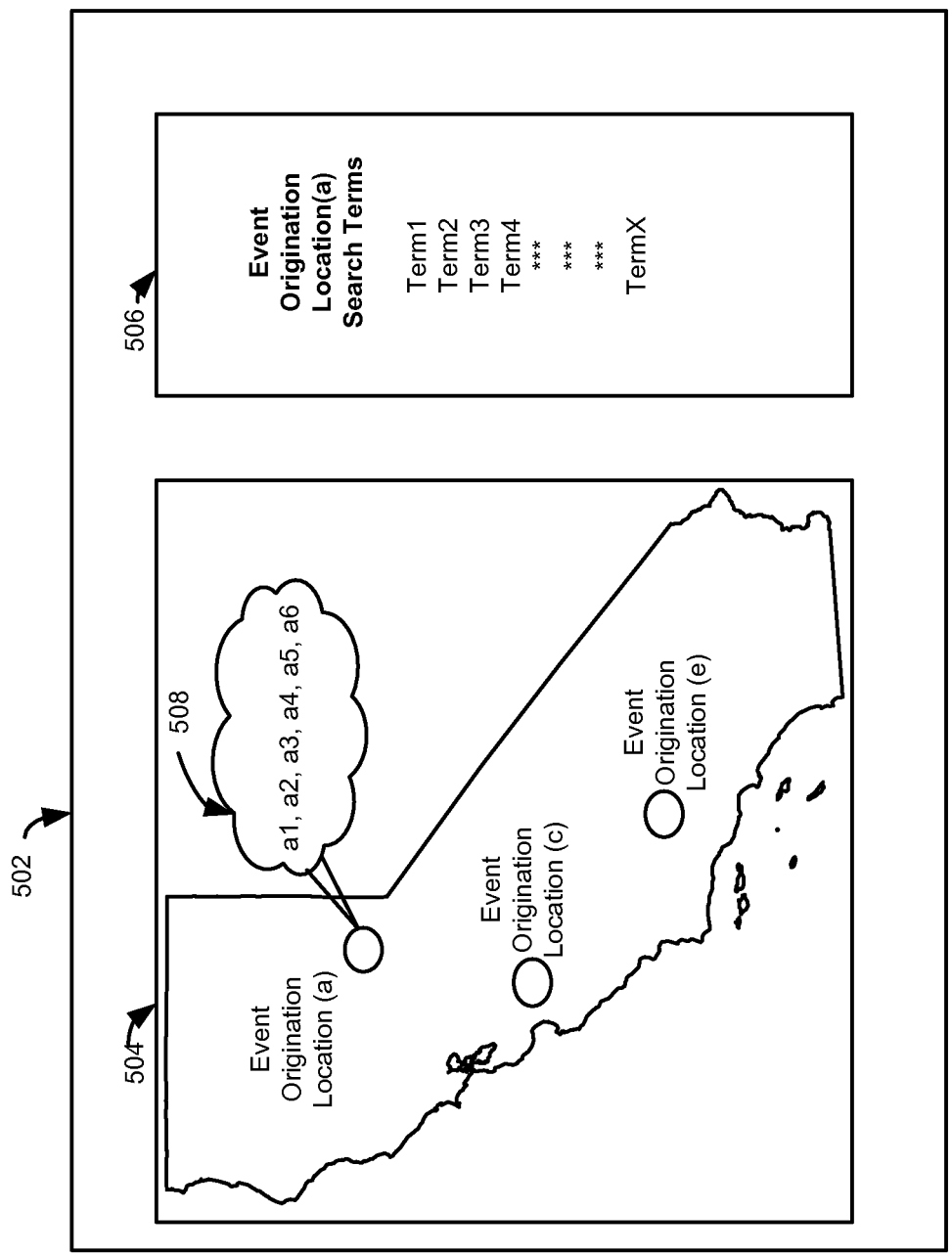
FIG. 5 illustrates an example of a display that may be generated based on generated statistics.

FIG. 5 illustrates an example of a display 502 that may be generated based on the generated statistics. The portion 504 of the display 502 graphically indicates (e.g., in a map format) geographic locations for indications of query terms and associated frequencies have been determined. In some examples, depending on a level of zoom for which the portion 504 is configured, the locations indicated in the portion 504 may be a function of the frequency of query terms for the locations. In the FIG. 5 example, a user may cause a cursor to hover over the graphic corresponding to a particular location (in the FIG. 5 example, location(a)), which then causes a "bubble" 508 to be displayed providing information about the query terms for that particular location. The information may be, for example, information regarding query terms and corresponding frequency for the particular location. Furthermore, an additional portion 506 may display the query terms for that particular location (e.g., the query terms may be displayed in a scrolling manner in the portion 506).

Figure 6:
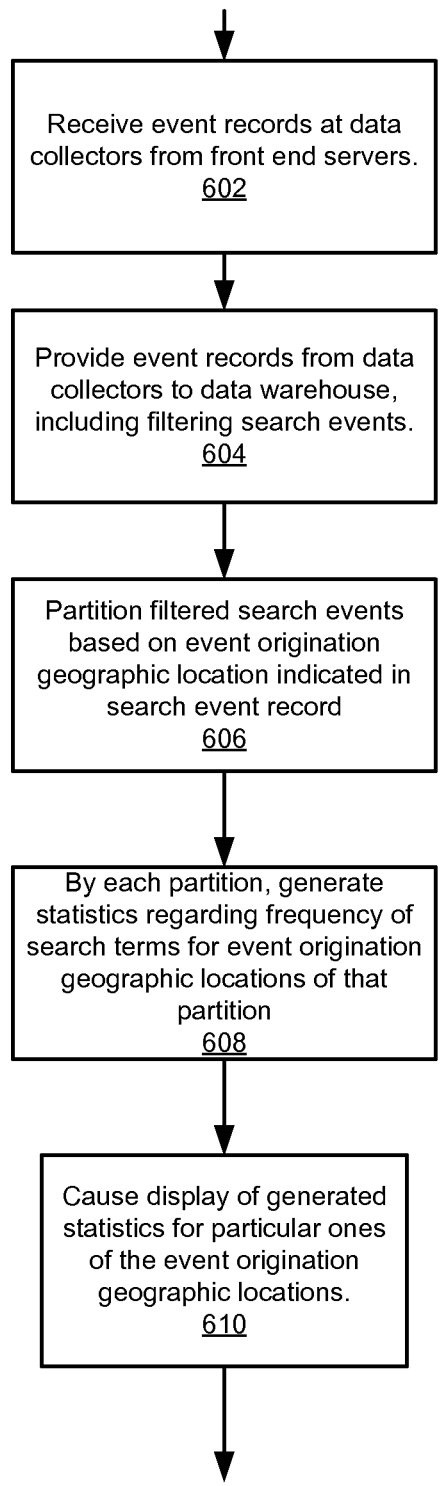
FIG. 6 is a flowchart of a method in accordance with an embodiment of the invention, to cause determination and display of the level of popularity of query terms provided to one or more search services.

FIG. 6 is a flowchart of a method in accordance with an embodiment of the invention, to cause determination and display of the level of popularity of query terms provided to one or more search services. At step 602, event records are received at data collectors from front end servers. At step 604, the event records are provided from the data collectors to a data warehouse. This includes filtering the event records for the search events. At step 606, the filtered search events are partitioned based on geographic location indicated in the search records. At step 608, each partition generates statistics regarding frequency of the search terms for geographic locations of that partition. At step 610, display of generated statistics regarding frequency of the search terms is caused for particular ones of the geographic locations. It is noted that the sequencing shown in FIG. 6 is not meant to imply that such a sequencing is required, as it should be apparent that some of the processing may occur in parallel and/or asynchronously. For example, the steps may occur in "real time" (e.g., in a pipelined fashion) with little or no batching. In fact, in some examples, there may be more buffering than batching.

We have thus described a method/system to determine frequency of keywords (search query terms) in a search-stream, with a low latency. Additionally, the stream may be partitioned geographically (e.g., by city) and/or temporally (e.g., by hour or by time of day such as morning, afternoon, evening, etc.), allowing a user of the determinations to discern geographic and temporal differences, e.g., in monetizing specific keywords. Search-events from front-end web-servers handling the search queries are processed in real-time. The latency of the frequency determinations may be less than one hour, or even under five minutes. Indications of keyword frequency, may be displayed, for example, relative to a map to allow for easy navigation.

What is claimed is:

1. A method of generating information indicative of frequency of events, having particular characteristics, relative to at least one online service, comprising:
  processing, by one or more computing systems in real-time, event indications being transmitted from front end servers for persistent storage, some of the event indications indicative of events that are not events relative to the at least one online service and some of the event indications indicative of events that are events relative to the at least one online service, the processing including detecting, as the event indications are being provided by the front end servers for persistent storage, event indications being provided from the front-end servers for persistent storage that are indicative of events relative to the at least one online service, wherein detecting includes selecting the event indications indicative of events that are relative to the at least one online service based, at least in part, on the event indications being received from search web servers of the front-end servers;

persistently storing, by the one or more computing systems, the event indications that are being provided from the front-end servers and are being processed to detect online service event indications that are indicative of the events relative to the at least one online service;

processing, by the one or more computing systems, the detected online service event indications and determining by the one or more computing systems in real-time, based at least in part thereon, by origin location of the events of which the detected online service event indications are indicative, frequency data indicative of a frequency of each of a plurality of characteristics of the events; and causing, by the one or more computing systems, an indication of at least some of the frequency data to be associated with indications of event origin locations to which the frequency data corresponds.

2. The method of claim 1, further comprising:
causing a display to be generated based on the association of the indication of at least some of the frequency data with the indications of event origin locations to which the frequency data corresponds.

3. The method of claim 2, wherein:
causing a display to be generated based on the association of the indication of at least some of the frequency data with indications of event origin locations to which the frequency data corresponds includes causing the display to be generated with indications of at least some of the frequency data superimposed on a map based on the indications of event origin locations to which the frequency data corresponds.

4. The method of claim 1, wherein:
processing the detected online service event indications transmitted from the front-end servers for persistent storage and determining, based at least in part thereon, by origin location of the events of which the detected online service event indications are indicative, frequency data indicative of a frequency of each of a plurality of characteristics of the particular events relative to the at least one online service includes updating the determination of frequency data based on newly processed detected event indications of the event indication being provided from the front-end servers for persistent storage.

5. The method of claim 4, wherein: updating the determinations of frequency data based on newly processed detected event indications of the event indication being provided from the front-end servers for persistent storage includes applying an algorithm that automatically decays frequency values of the frequency data over time.

6. The method of claim 1, wherein the event indications include event records, each of the event records having fields whose contents indicate characteristics of a corresponding event, wherein each of the event records includes a field whose contents correspond to a front-end server.

7. The method of claim 1, wherein the online service is an online search service.

8. The method of claim 7, wherein the frequency data indicates a frequency of each of a plurality of search terms presented to the at least one online service.

9. The method of claim 1, each of the event indications corresponding a single event record having fields whose contents indicate characteristics of a corresponding event.

10. A method of generating information indicative of frequency of events, having particular characteristics, relative to at least one online search service, comprising:
processing, by one or more computing systems in real-time, event indications, being transmitted from front end servers for persistent storage by at least persistently storing the event indications that are being provided from the front-end servers, some of the event indications indicative of events that are not events relative to the at least one online search service and some of the event indications indicative of events that are events relative to the at least one online search service;

selecting by the one or more computing systems, as the event indications are being provided from the front end servers for persistent storage, the event indications indicative of events that are relative to the at least one online search service;

processing, by the one or more computing systems, the selected event indications and determining by the one or more computing systems in real-time, based at least in part thereon, by origin location of events of which the selected event indications are indicative, frequency data indicative of a frequency of each of a plurality of characteristics of the events; and causing, by the one or more computing systems, an indication of at least some of the frequency data to be associated with indications of event origin locations to which the frequency data corresponds.

11. The method of claim 10, further comprising:
causing a display to be generated based on the association of the indication of at least some of the frequency data with indications of event origin locations to which the frequency data corresponds.

12. The method of claim 11, wherein:
causing a display to be generated based on the association of the indication of at least some of the frequency data with indications of event origin locations to which the frequency data corresponds and with indications of time periods to which the frequency data corresponds includes causing the display to be generated with indications of at least some of the frequency data superimposed on a map based on the indications of event origin locations to which the frequency data corresponds.

13. The method of claim 12, wherein the time periods comprise days.

14. The method of claim 10, wherein:
processing the detected online service event indications and determining frequency data indicative of a frequency of each of a plurality of characteristics of particular events relative to the at least one online search service includes updating the determination of frequency data based on newly processed event indications of the event indication being provided from the front-end servers for persistent storage.

15. The method of claim 14, wherein:
updating the determinations of frequency data based on newly processed event indications of the event indication being provided from the front-end servers for persistent storage includes applying an algorithm that automatically decays frequency values of the frequency data over time.

16. The method of claim 10, wherein selecting the event indications indicative of events that are relative to the at least one online search service is performed based, at least in part, on the event indications being received from search web servers of the front-end servers.

17. A method of generating information indicative of frequency of events, having particular characteristics, relative to at least one online service, comprising:
processing, by one or more computing systems in real-time, event indications being transmitted from front end servers for persistent storage, some of the event indications indicative of events that are not events relative to the at least one online service and some of the event indications indicative of events that are events relative to the at least one online service, the processing including detecting, as the event indications are being provided from the front end servers for persistent storage, the event indications being provided from the front-end servers for persistent storage that are indicative of events relative to the at least one online service, wherein detecting includes selecting the event indications indicative of events that are relative to the at least one online service based, at least in part, on the event indications being received from search web servers of the front-end servers;
persistently storing, by the one or more computing systems, the event indications that are being provided from the front-end servers and are being processed to detect online service event indications that are indicative of the events relative to the at least one online service;
processing, by the one or more computing systems, the detected online service event indications and determining by the one or more computing systems in real-time, based at least in part thereon, by values for a particular characteristic of the users who initiated events of which the online service event indications are indicative, frequency data indicative of a frequency of each of a plurality of characteristics of the events; and
causing, by the one or more computing systems, an indication of at least some of the frequency data to be associated with indications of the values for the particular characteristic of the users, to which the frequency data corresponds, wherein the online service is an online search service.

18. The method of claim 17, wherein processing the detected online service event indications and determining frequency data indicative of a frequency of each of a plurality of characteristics of particular events relative to the at least one online service comprises:
updating the determination of frequency data based on newly processed detected event indications of the event indication being provided from the front-end servers for persistent storage.

19. The method of claim 18, wherein updating the determinations of frequency data based on newly processed detected event indications of the event indication being provided from the front-end servers for persistent storage includes applying an algorithm that automatically decays frequency values-over time.

20. The method of claim 17, further comprising:
causing a display to be generated based on the association of the indication of at least some of the frequency data, with indications of the values for the particular characteristic of the users, to which the frequency data corresponds.

21. The method of claim 20, wherein causing a display to be generated based on the association of the indication of at least some of the frequency data, with indications of the values for the particular characteristic of the users, to which the frequency data corresponds, includes causing the display to be generated with indications of at least some of the frequency data superimposed on a map based on the indications of the values for the particular characteristic of the users, to which the frequency data corresponds.

22. A method of generating information indicative of frequency of events, having particular characteristics, relative to at least one online service, comprising:
processing, by one or more computing systems in real-time, event indications being transmitted from front end servers for persistent storage by at least persistently storing the event indications that are being provided from the front-end servers, some of the event indications indicative of events that are not events relative to the at least one online service and some of the event indications indicative of events that are events relative to the at least one online service;
selecting, by the one or more computing systems as the event indications are being provided from the front end servers for persistent storage, the event indications indicative of events that are relative to the at least one online service;
processing, by the one or more computing systems, the selected event indications and determining by the one or more computing systems in real-time, based at least in part thereon, by values for a particular characteristic of the users who initiated events of which the event indications are indicative, frequency data indicative of a frequency of each of a plurality of characteristics of the events; and
causing, by the one or more computing systems, an indication of at least some of the frequency data to be associated with indications of values for a particular characteristic of the users to which the frequency data corresponds.

23. The method of claim 22, further comprising:
causing a display to be generated based on the association of the indication of at least some of the frequency data, with indications of values for a particular characteristic of the users who initiated the events to which the frequency data corresponds.

24. The method of claim 23, wherein:
causing a display to be generated based on the association of the indication of at least some of the frequency data, with indications of values for a particular characteristic of the users who initiated the events and indications of values for time periods, to which the frequency data corresponds, includes causing the display to be generated with indications of at least some of the frequency data superimposed on a map based on the indications of values for a particular characteristic of the users who initiated the events to which the frequency data corresponds.

25. The method of claim 24, wherein the time periods comprise hours.

26. The method of claim 24, wherein the time periods comprise a time of day, the time of day including at least one of morning, afternoon, or evening.

27. The method of claim 22, wherein processing the detected online service event indications and determining frequency data indicative of a frequency of each of a plurality of characteristics of particular events relative to the at least one online service comprises:
   updating the determination of frequency data based on newly processed online service event indications being provided from the front-end servers for persistent storage.

28. The method of claim 27, wherein updating the determinations of frequency data based on newly processed event indications being provided from the front-end servers for persistent storage comprises applying an algorithm that automatically decays frequency values over time.

29. The method of claim 22, wherein the online service is an online search service.

* * * * *